(12) United States Patent
Mrugalla et al.

(10) Patent No.: US 9,752,640 B2
(45) Date of Patent: Sep. 5, 2017

(54) STOP CAP

(75) Inventors: Damian Mrugalla, Dortmund (DE); Markus Schrichten, Schmallenberg (DE)

(73) Assignee: Thyssenkrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 13/642,765

(22) PCT Filed: Mar. 26, 2011

(86) PCT No.: PCT/EP2011/001529
§ 371 (c)(1),
(2), (4) Date: Oct. 22, 2012

(87) PCT Pub. No.: WO2011/131282
PCT Pub. Date: Oct. 27, 2011

(65) Prior Publication Data
US 2013/0043625 A1   Feb. 21, 2013

(30) Foreign Application Priority Data
Apr. 23, 2010   (DE) .................. 10 2010 018 044

(51) Int. Cl.
*F16F 5/00* (2006.01)
*F16F 9/32* (2006.01)
(Continued)

(52) U.S. Cl.
CPC .............. *F16F 9/3242* (2013.01); *F16F 9/38* (2013.01)

(58) Field of Classification Search
CPC ............ B60G 2202/31; B60G 2204/45; B60G 2204/45021; B60G 2206/91; F16F 9/0454; F16F 9/3242; F16F 9/38
(Continued)

(56) References Cited

U.S. PATENT DOCUMENTS 1,107,714 A * 8/1914 Sharp .............................. 267/35
4,022,448 A    5/1977 Reeder
(Continued)

FOREIGN PATENT DOCUMENTS

DE    91 09 020.2 U1   10/1991
DE    41 37 447 A1      5/1992
(Continued)

OTHER PUBLICATIONS

International Search Report with English translation dated Jul. 27, 2011 (six (6) pages).
(Continued)

*Primary Examiner* — Melody Burch
(74) *Attorney, Agent, or Firm* — Crowell & Moring LLP

(57) ABSTRACT

A cap for mounting on a damper tube of a vibration damper, having an outer shell region that is cylindrical at least in sections and at least one elastic spring tongue. At least one positively locking element is arranged on the spring tongue in order to produce a positively locking connection between the cap and a protective element of the vibration damper. The at least one spring tongue has a region which, in the non-mounted state of the cap, is set back inwardly in the radial direction with respect to the outer shell region. The set-back region has a spreading element, by way of which the spring tongue is spread outwardly in the radial direction during the mounting of the cap.

8 Claims, 3 Drawing Sheets

Figure 1:
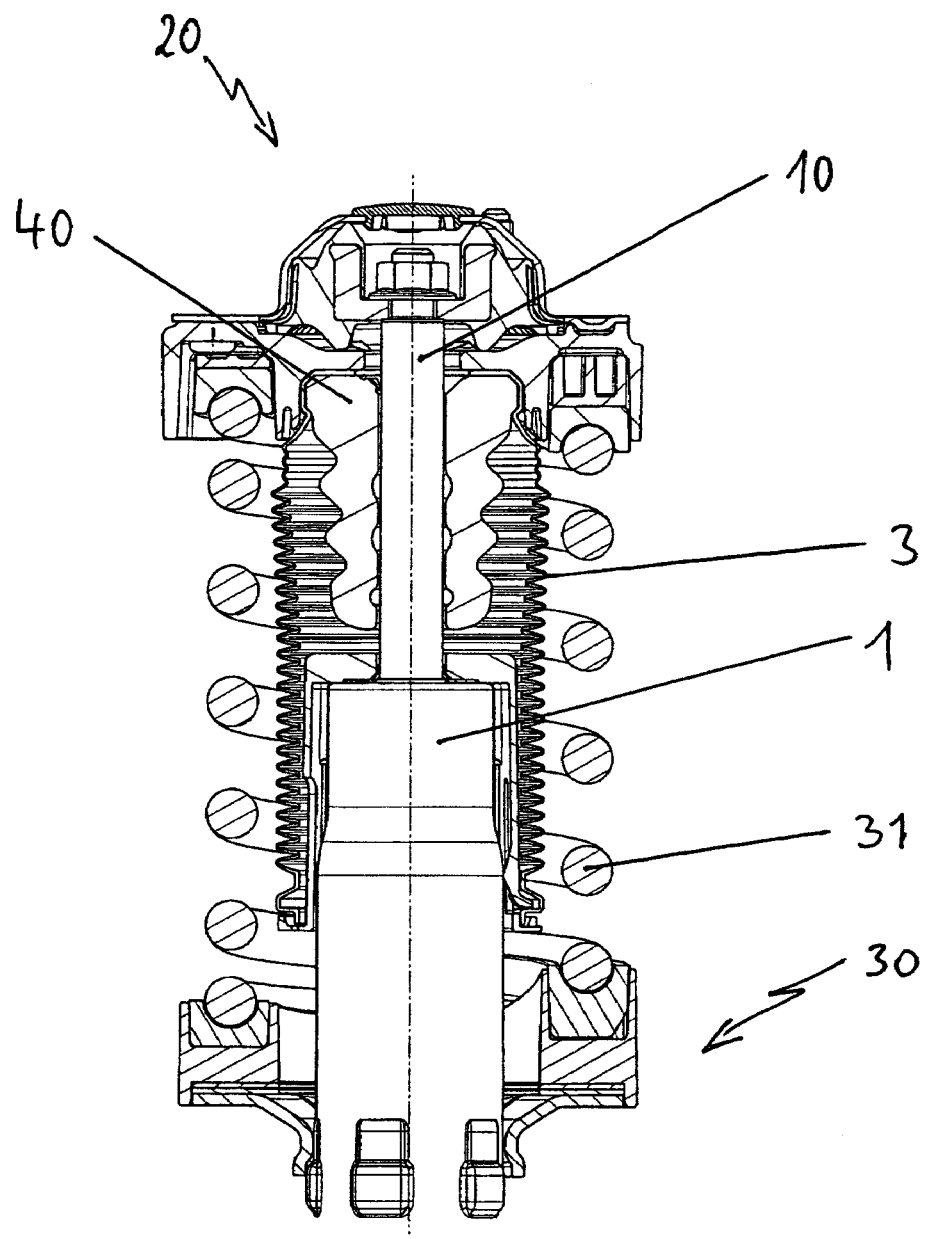

(51) Int. Cl.
*F16F 9/38* (2006.01)
*F16F 9/04* (2006.01)

(58) Field of Classification Search
USPC ............ 267/64.19, 64.21, 64.23, 64.24, 122;
188/298, 322.22, 322.12, 322.18, 322.19
See application file for complete search history.

(56) References Cited

U.S. PATENT DOCUMENTS

| | | | |
|---|---|---|---|
| 4,828,232 A * | 5/1989 | Harrod et al. | 267/64.24 |
| 5,301,777 A | 4/1994 | Handke | |
| 5,460,354 A * | 10/1995 | Easter | 267/64.27 |
| 6,827,342 B2 * | 12/2004 | Klitsch et al. | 267/64.23 |
| 7,364,177 B2 | 4/2008 | Handke et al. | |
| 8,418,821 B2 | 4/2013 | Henneberg et al. | |
| 2002/0189441 A1 | 12/2002 | Collis et al. | |
| 2003/0160367 A1 | 8/2003 | Klitsch et al. | |
| 2004/0026837 A1 * | 2/2004 | Ferrer | 267/64.23 |
| 2007/0187197 A1 | 8/2007 | Imaeda et al. | |

FOREIGN PATENT DOCUMENTS

| | | |
|---|---|---|
| DE | 101 22 796 A1 | 12/2002 |
| DE | 10 2004 021 497 A1 | 12/2005 |
| DE | 10 2007 059 800 A1 | 6/2009 |

OTHER PUBLICATIONS

Form PCT/ISA/237 (six (6) pages).
German Office Action issued in German counterpart application No. 10 2010 018 044.0—12 dated Dec. 8, 2010 (Four (4) pages).

* cited by examiner

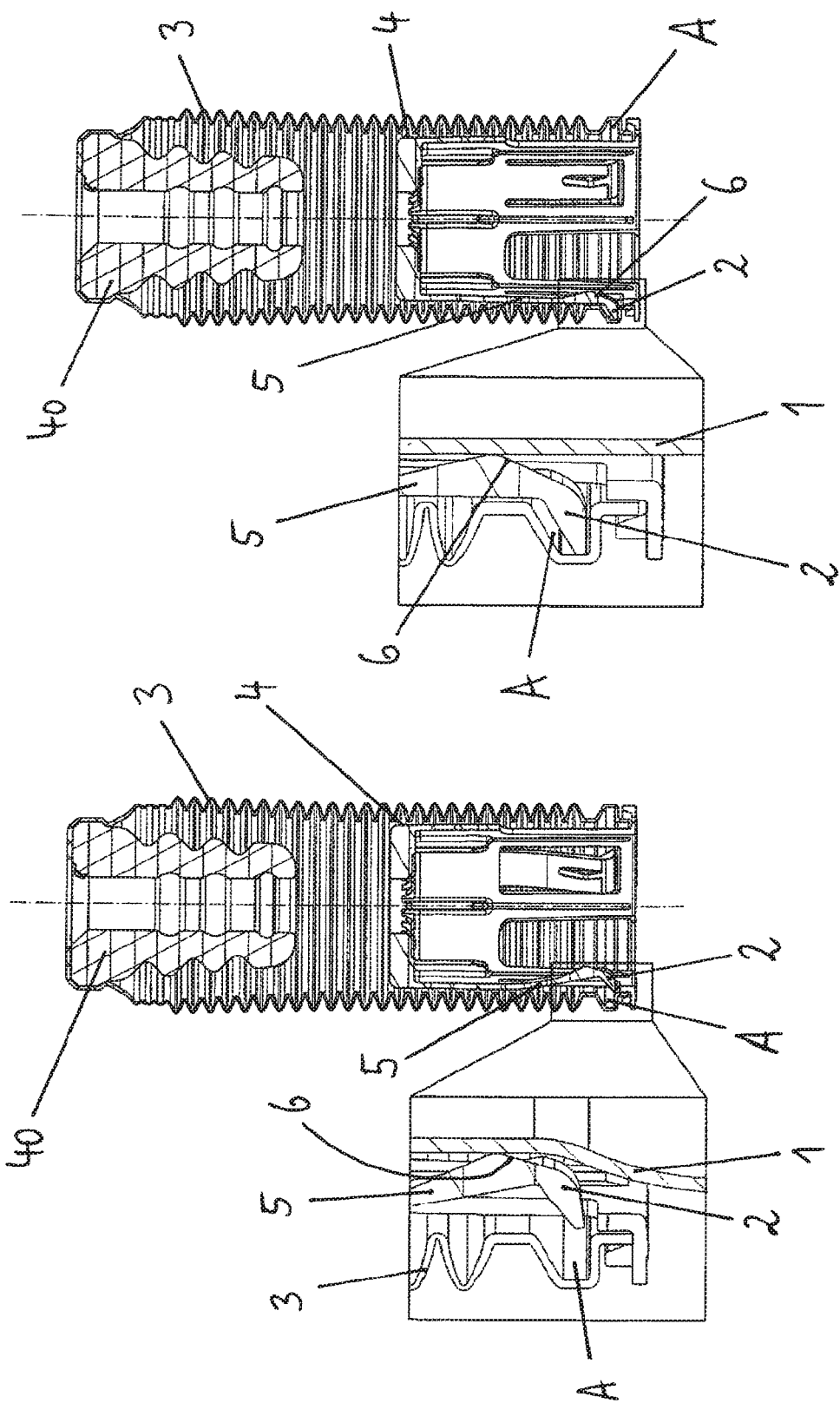

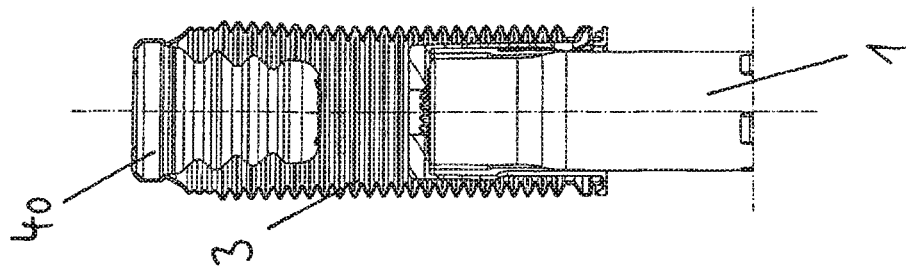
Fig. 4e
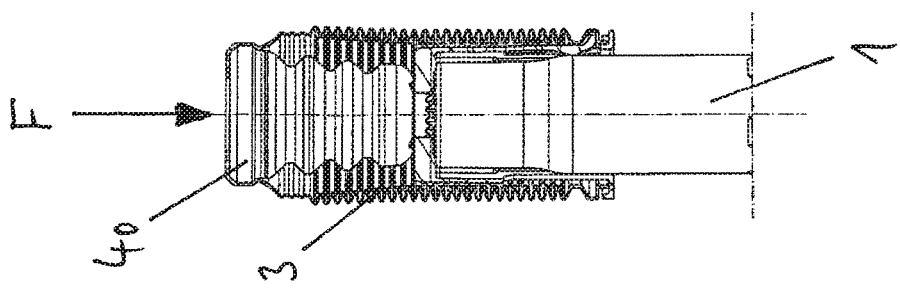
Fig. 4d
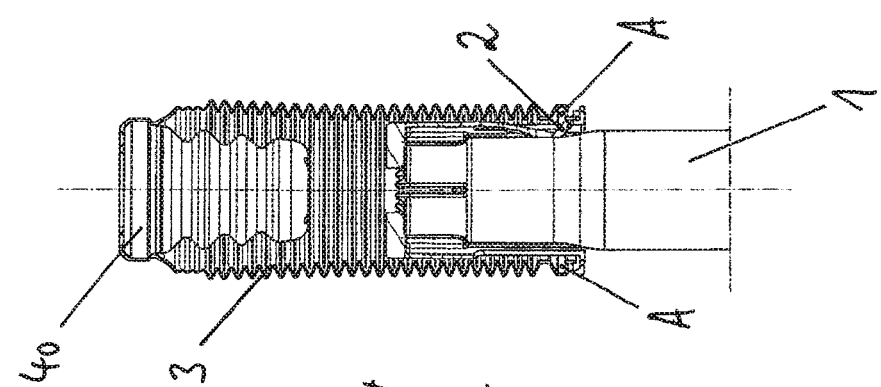
Fig. 4c
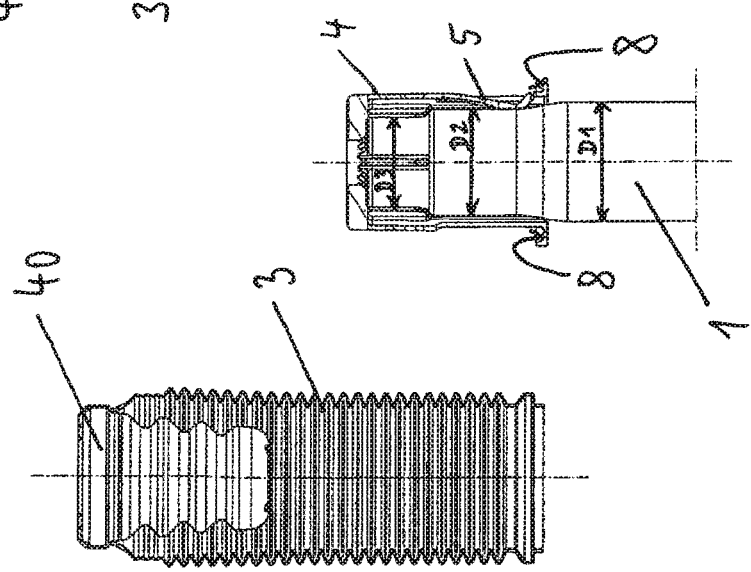
Fig. 4b
Fig. 4a

STOP CAP

BACKGROUND AND SUMMARY OF THE INVENTION

The invention relates to a cap for assembly onto a damper tube of a vibration damper, having an outer peripheral region which is cylindrical at least in sections, and at least one resilient spring tongue, wherein disposed on the spring tongue is at least one positive-locking element for producing a positive-locking connection between the cap and a protective element of the vibration damper.

German Patent Document DE 101 22 796 B4 discloses such a cap. The vibration damper described in this document includes a container tube in which a piston rod is guided in an axially movable manner, said piston rod being at least partially covered by a protective tube having at least one resilient fold. A stop buffer is disposed concentrically with respect to the piston rod, the stop buffer comes to lie against an end cap in an end region of a retracting movement of the piston rod. The end cap lies against the container tube in a completely assembled vibration damper. The stop buffer, the protective tube and the end cap form a preassembled structural unit independent of the vibration damper. The end cap is pressed against the container tube by the stop buffer when the piston rod undergoes a deflection movement into the container tube. For the purposes of connecting to the protective tube, the end cap comprises an edge that is circumferential at least in sections and is connected in a positive-locking manner to the protective tube. The end cap is designed to be radially resilient in the region of its edge. The container tube has a length section having a reduction in diameter in the direction of the end cap to be assembled.

A disadvantage in this known vibration damper is that the stop buffer, the protective tube and the end cap are to form a preassembled structural unit independent of the vibration damper. These components must thus be assembled to form a preassembled structural unit in a dedicated, separate working step, which requires a suitable tool in order to be able to achieve a uniform resilient deformation of the resilient segments of the end cap in order to be able to latch the protective tube with the end cap. In order to produce the positive-locking connection, a particular tool is thus required, which has to be separately obtained or produced. The assembly process is thus more complex and the production costs for the vibration damper are increased.

Exemplary embodiments of the present invention are directed to a vibration damper of the type mentioned in the introduction that can be assembled in a cost-effective manner by means of a simple assembly process.

In accordance with the invention, the at least one spring tongue comprises a region, which in the non-assembled state or in the delivery state of the cap, is set back radially inwards with respect to the outer peripheral region, wherein the set-back region comprises a spreading element by means of which the spring tongue is radially spread outwards when the cap is being assembled. By virtue of the region of the spring tongue that is radially set back with respect to the outer peripheral region, the positive-locking element is also radially set back to a position in which it cannot enter into a positive-locking connection with the protective element. Only when the cap is assembled on the damper tube is the spreading element actuated, which means that the spring tongue is spread radially outwards to such an extent that the positive-locking element moves into a position in which it enters a positive-locking connection with the protective element. Thus, the present invention does not require a particular tool for producing the positive-locking connection. The spreading element is actuated by the process of assembling the cap onto the damper tube, which is required in any case.

In accordance with a preferred embodiment of the invention, the cap is assembled by simply being slid onto the damper tube. The damper tube itself actuates the spreading element. The spreading element can be formed advantageously as an inclined surface or rounded section that is formed on the spring tongue of the cap. The inclined surface is preferably inclined radially inwards. Such an inclined surface or rounded section acts as a passive spreading element that co-operates with the damper tube when the cap is being assembled, i.e., no tool is required to spread the spring tongue radially outwards. The damper tube can have a constant diameter, in which case the spring tongues of the cap are adapted to the damper tube diameter. Alternatively, the damper tube can have a diameter enlargement, which means that only the larger diameter co-operates with the spreading element. This latter embodiment is described in more detail hereinafter during the description of a specific exemplified embodiment. The basic assembly process is the same for both of the aforementioned variations, i.e., regardless of whether the damper tube has a constant diameter or a diameter enlargement.

In accordance with exemplary embodiments of the present invention, the cap comprises several spring tongues that are disposed distributed over the circumference of the cap. In a particularly preferred manner, three spring tongues are provided distributed at regular intervals over the circumference of the cap. This ensures a reliable positive-locking connection between the cap and the protective element.

In accordance with a structurally simple embodiment of the invention, the positive-locking element is formed as an integral component of the spring tongue. For instance, the positive-locking element can be formed as a latching lug attached to or integrally formed on the spring tongue. The positive-locking element engages into a corresponding recess in the protective element in the assembled state of the cap so that that these two components are connected together in a positive-locking manner.

In an advantageous manner, the cap comprises a stop surface for positioning the protective element by means of which the protective element can be positioned relative to the positive-locking element in a position suitable for forming the positive-locking connection. The protective element lies against the stop surface in the assembled position. The stop surface is disposed on the cap such that a receptacle, provided on the protective element, for the positive-locking element is positioned relative thereto such that the positive-locking element penetrates radially outwards into the receptacle by virtue of the spreading action of the spring tongue produced when the cap is assembled. In this manner, the protective element is readily aligned into the correct position for forming the positive-locking connection. In accordance with a preferred embodiment of the invention, the stop surface is formed as a circular ring-shaped surface in order to reliably and effectively position the protective element relative to the cap.

BRIEF DESCRIPTION OF THE DRAWING FIGURES

The invention will be explained in more detail hereinafter with reference to a drawing illustrating an exemplified embodiment. The drawings show in detail:

FIG. 1 illustrates a vibration damper having a cap in accordance with the invention in a partially sectional side view, FIGS. 2, 2a, 3 and 3a illustrate a partially sectional side view of the cap in accordance with the invention in two different assembly states, FIGS. 4a-4e illustrate the assembly process when assembling the cap in accordance with the invention onto a vibration damper.

DETAILED DESCRIPTION

FIG. 1 shows a vibration damper having a cap in accordance with the invention, which is assembled onto one end of the damper tube 1 of the vibration damper. A piston rod 10 exits from the damper tube 1. The piston rod 10 is guided so as to be movable in an oscillating and reciprocating fashion in a sealing and guiding assembly which is not shown in FIG. 1 and is disposed on the piston rod exit-side end of the damper tube 1. With its end remote from the damper tube 1, the piston rod 10 is fixedly connected to a damper bearing assembly 20. The damper bearing assembly 20 will hereinafter be abbreviated to "damper bearing 20". The damper bearing 20 is fixedly connected to a vehicle body of a motor vehicle which is not shown.

The damper tube 1 supports a spring plate 30 on which a spring end of a vehicle bearing spring 31 is supported. The other end of the vehicle bearing spring 31 is supported on the damper bearing 20.

The piston rod 10 is protected against surface damage and ingress of dirt by a protective element 3 surrounding it. The protective element 3 is formed as bellows in the illustrated exemplified embodiment. A spring element 40 is disposed in the interior of the protective element 3. The spring element 40 is supported with its end remote from the damper tube 1 on the damper bearing 20. The other end of the spring element 40 faces the damper tube 1 or the cap assembled on the damper tube 1. When a particular degree of deflection of the piston rod 10 is reached, i.e., when the telescopic vibration damper has been telescoped to a particular extent, the spring element 40 strikes the cap. The cap in accordance with the invention is thus also referred to by persons skilled in the art by the functional term "stop cap".

The present invention relates to a particular configuration of the cap by means of which the vibration damper illustrated in FIG. 1 can be assembled in a cost-effective manner by means of a simple assembly process. In this respect, the stop cap is formed in a particular manner in order to produce in a simple manner the inventive positive-locking connection between the cap and the protective element 3. The particular configuration of the cap is explained in more detail hereinafter with reference to FIGS. 2-3.

In the non-enlarged illustration in FIGS. 2 and 3, the cap formed in accordance with the invention, the protective element 3 and the spring element 40 without the vibration damper, the vehicle bearing spring 31 and the damper bearing 20 are illustrated. In both of the left-hand parts of the images in FIGS. 2a and 3a, a section enlargement of the cap in accordance with the invention and of the protective element 3 and a partial section of the damper tube 1 (which is not illustrated in the non-enlarged parts of the images) are illustrated. FIGS. 2-2a illustrate the non-assembled state of the cap in accordance with the invention. The situation illustrated in FIG. 2a is the situation in which the cap and the protective element 3 are located immediately prior to assembly on the damper tube 1 (also see in this respect hereinafter with respect to FIG. 4a-4e).

FIGS. 3-3a illustrate the cap in accordance with the invention and the protective element 3 in the state assembled onto the damper tube 1. In this state, the cap in accordance with the invention together with the protective element 3 is assembled on the damper tube 1 and there is a positive-locking connection between the protective element 3 and the cap.

In the illustration in FIGS. 2-2a, the spring tongue 5 of the cap is set back radially inwards with respect to the cylindrical outer peripheral region 4 in its region leading towards the positive-locking element 2. It can be clearly seen that the positive-locking element 2 is not engaged with a corresponding recess A in the protective element 3. Thus, a positive-locking connection between the cap and the protective element 3 is not formed. The protective element 3 could readily be removed upwards from the cap since the two components are not connected together in terms of a subassembly.

In order to form a positive-locking connection between the cap and the protective element 3, the positive-locking element 2 has to engage into the receptacle A of the protective element. In order to achieve this, the positive-locking element 2 is disposed on a spring tongue 5. The spring tongue 5 is pressed radially outwards when the cap is slid onto the damper tube 1, which means that the positive-locking element 2 engages into the recess A of the protective element 3 in a positive-locking manner. This state is illustrated in FIGS. 3-3a. In order to effect the described spreading of the spring tongue 5 radially outwards, the region of the spring tongue 5 set back with respect to the cylindrical outer peripheral region 4 comprises a spreading element 6. The spreading element 6 is formed as a simple inclined surface in the illustrated exemplified embodiment. This inclined surface can slide on the outer surface of the damper tube 1 when the cap is pressed onto the damper tube end. The damper tube 1 comprises a diameter enlargement from a diameter D2 to a diameter D1 (cf. FIGS. 4a-4e), which means that when pressing the cap onto the damper tube 1, the inclined surface forming the spreading element 6 is pressed radially outwards by the increasing diameter of the damper tube 1. The spring tongue 5 spreads outwards which means that the positive-locking element 2 engages into the recess A of the protective element 3 in a positive-locking manner. The positive-locking engagement of the positive-locking element 2 into the recess A of the protective element 3 is illustrated in FIGS. 3-3a.

The section enlargement illustrated in FIG. 2a illustrates a preassembly state or even a delivery state of the cap in which the spring tongues 5 and the positive-locking elements 2 are bent radially inwards. The positive-locking elements 2 are set out radially outwards—owing to the diameter enlargement of the damper tube 1—only when the cap is slid onto the damper tube 1.

FIGS. 4a-4e illustrate the simple assembly of the cap in accordance with the invention on the damper tube 1. Beneath the number 1, a protective element 3 is illustrated in which a spring element 40 has been incorporated. Beneath the number 2, the damper tube 1 having a loosely placed cap in accordance with the invention is illustrated. The cap is disposed on a section of the damper tube having a reduced diameter. The radially inwardly bent spring tongues 5 can be clearly seen in FIGS. 4a-4e beneath the number 2. The cap in accordance with the invention further comprises a stop surface 8 on which the protective element 3 can be supported for the correct positioning of the protective element 3 relative to the cap in accordance with the invention.

In the embodiment illustrated in FIGS. 4a-4e, the damper tube 1 comprises three sections having different diameters as seen in the axial direction. The cap in accordance with the invention with its spring tongues is dimensioned such that when pressing the cap onto the damper tube, the largest diameter D1 effects the spreading of the spring tongues and thus the positive-locking connection between the protective element 3 and the cap. On the reduced-diameter section having the diameter D2, the cap in accordance with the invention can be loosely placed, which means that the spring tongues are not spread radially outwards or are so only slightly. In this state, the protective element 3 can be placed onto the cap as described hereinafter and the recesses A are positioned relative to the positive-locking elements 2 such that a positive-locking connection is produced when the spring tongues are spread radially outwards. The end section of the damper tube 1 has the smallest diameter D3. The cap in accordance with the invention has radially inwardly protruding ribs in its end region. The clearance between these ribs is dimensioned to be adapted to the smallest diameter D3 such that after the cap has been pressed on, a frictionally-engaged connection between the cap and the damper tube is provided. In this manner, the pressed-on cap is fixedly seated in the axial direction on the damper tube.

Beneath the number 3 in FIG. 3, the protective element 3 loosely placed onto the cap in accordance with the invention having the spring element 4 connected thereto is illustrated. In this state, the cap is loosely placed onto the damper tube 1 and the protective element 3 is loosely placed onto the cap. The protective element 3 is supported on the stop surface 8 of the cap. As a result, the receptacles A in the protective element 3 are positioned precisely in the provided position for forming the positive-locking connection relative to the positive-locking elements 2 of the cap.

Beneath the number 4 in FIGS. 4a-4e, the actual assembly step, i.e., pressing the cap in accordance with the invention onto the damper tube 1 forming the positive-locking connection between the protective element 3 and the cap is illustrated. In this respect, the protective element 3, i.e., the bellows, is compressed by a force F from the outside which means that the spring element 40 lies against the cap in accordance with the invention. The cap is then pressed onto the damper tube 1 by the force F acting on the spring element 40. Since a so-called "setting stroke" already occurs in terms of the conventional assembly of motor vehicle spring struts with bellows, this setting stroke can be used to also perform the above-mentioned assembly step in an identical manner. In this respect, no additional assembly step is required.

When pressing the cap onto the damper tube 1, the spring tongues 5 are spread radially outwards owing to the diameter enlargement of the damper tube 1. The positive-locking elements 2 penetrate into the receptacles A of the protective element 3, which means that a positive-locking connection between the cap and the protective element 3 is formed. The force required for pressing the cap onto the damper tube 1 in this manner is represented by an arrow and the letter F in FIGS. 4a-4e beneath the number 4.

If the force required for pressing the cap onto the damper tube 1 is removed and the protective element 3 formed as bellows is relieved, then the bellows spring back to the position illustrated beneath the number 5 in FIGS. 4a-4e. The spring element 40 is then removed from the cap and is positioned by the protective element 3 at a provided spaced disposition with respect to the cap. The cap is fixedly seated on the end of the damper tube 1 and is connected to the protective element 3 in a positive-locking manner.

In accordance with the present invention, no particular tools are required for the assembly of the cap and the positive-locking element connected thereto in a positive-locking manner. The cap in accordance with the invention already contains all of the features required for the correct positioning of the protective element 3 relative to the positive-locking elements 2 of the cap, since the correct positioning of the protective element 3 relative to the cap is achieved in a simple manner by the stop surfaces 8 formed on the cap itself. Furthermore, in the case of the invention, the setting stroke performed within the scope of the conventional procedure when assembling motor vehicle spring struts with bellows is also adeptly used for assembling the arrangement of the protective element 3, spring element 40 and cap. An additional assembly step is not required.

The invention provides a simple and cost-effective solution for producing a vibration damper having a protective element 3 protecting the piston rod and a spring element 40 used as a stop buffer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Damper tube
2 Positive-locking element
3 Protective element
4 Outer peripheral region
5 Spring tongue
6 Spreading element
7 Surface
8 Stop surface
10 Piston rod
20 Damper bearing
30 Spring plate
31 Vehicle bearing spring
40 Spring element
A Recess

The invention claimed is:

1. A cap for assembly onto a damper tube of a vibration damper, the cap comprising:
    an outer peripheral region that is cylindrical at least in sections;
    at least one resilient spring tongue, wherein disposed on the at least one spring tongue is at least one positive-locking element configured to produce a positive-locking connection between the cap and a protective element of the vibration damper; and
    a circular ring shaped stop surface of the outer peripheral region, which is configured to position the protective element, by means of which the protective element is positionable relative to the positive-locking element in a position suitable for forming the positive-locking connection,
    wherein the at least one spring tongue comprises a region that is set back radially inwards with respect to the outer peripheral region in a non-assembled state of the cap,
    wherein the set-back region comprises a spreading element configured so that the at least one spring tongue is radially spread outwards when the cap is being assembled, and wherein the protective element has a bellows-shaped interior profile having a plurality of recesses and the at least one spring tongue is configured to engage into one of the plurality of recesses in an assembled state such that the cap is retained against an upward and downward movement in an axial direction of the cap.

2. The cap as claimed in claim 1, wherein the at least one spring tongue comprises several spring tongues disposed so that they are distributed over a periphery of the cap.

3. The cap as claimed in claim 1, wherein the spreading element is an inclined surface or rounded section configured to cooperate with the damper tube when the cap is being assembled.

4. The cap as claimed in claim 1, wherein the at least one positive-locking element is an integral component of the at least one spring tongue.

5. A cap for assembly onto a damper tube of a vibration damper, the cap comprising:
   an outer peripheral region that is cylindrical at least in sections;
   at least one resilient spring tongue, wherein disposed on the at least one spring tongue is at least one positive-locking element configured to produce a positive-locking connection between the cap and a protective element of the vibration damper; and
   a circular ring shaped stop surface of the outer peripheral region, which is configured to position the protective element, by means of which the protective element is positionable relative to the positive-locking element in a position suitable for forming the positive-locking connection,
   wherein the at least one spring tongue comprises a region that is set back radially inwards with respect to the outer peripheral region in a non-assembled state of the cap,
   wherein the set-back region comprises a spreading element configured so that the at least one spring tongue is radially spread outwards when the cap is being assembled, and
   wherein, in a direction of insertion of the cap into the protective element, an entirety of the at least one spring tongue, including the at least one positive-locking element, is arranged closer to a top of the cap than the stop surface.

6. The cap as claimed in claim 5, wherein the at least one spring tongue comprises several spring tongues disposed so that they are distributed over a periphery of the cap.

7. The cap as claimed in claim 5, wherein the spreading element is an inclined surface or rounded section configured to cooperate with the damper tube when the cap is being assembled.

8. The cap as claimed in claim 5, wherein the at least one positive-locking element is an integral component of the at least one spring tongue.

\* \* \* \* \*